J. JAGGARD.
AUTOCYCLE ATTACHMENT.
APPLICATION FILED DEC. 28, 1916.

1,231,163.

Patented June 26, 1917.

Witnesses:
J. F. MacIndoe
W. H. Lawrence

Inventor:
John Jaggard
By M. Van Booskirk
Attorney

UNITED STATES PATENT OFFICE.

JOHN JAGGARD, OF COLLINGSWOOD, NEW JERSEY.

AUTOCYCLE ATTACHMENT.

1,231,163.   Specification of Letters Patent.   Patented June 26, 1917.

Application filed December 28, 1916. Serial No. 139,316.

*To all whom it may concern:*

Be it known that I, JOHN JAGGARD, a citizen of the United States, residing at Collingswood, in the county of Camden and State of New Jersey, have invented certain new and useful Improvements in Autocycle Attachments, of which the following is a specification.

The objects of my invention are to provide means for operating and controlling a motor-cycle from a side car secured to said motor cycle, and such other objects as will more fully hereinafter appear.

The invention consists in the construction, combination and arrangement of parts hereinafter set forth in and falling within the scope of the claims.

Figure 1:
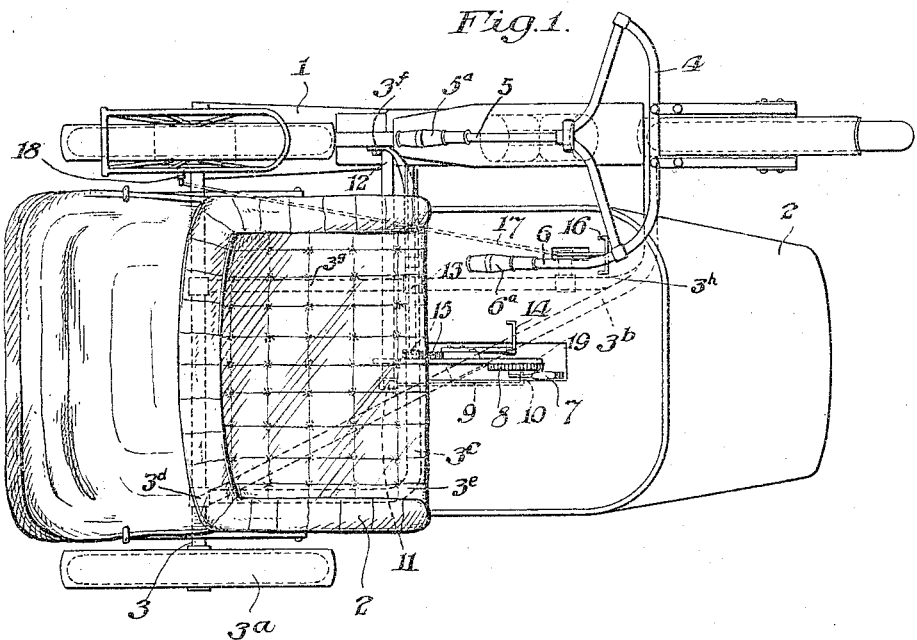
Figure 2:
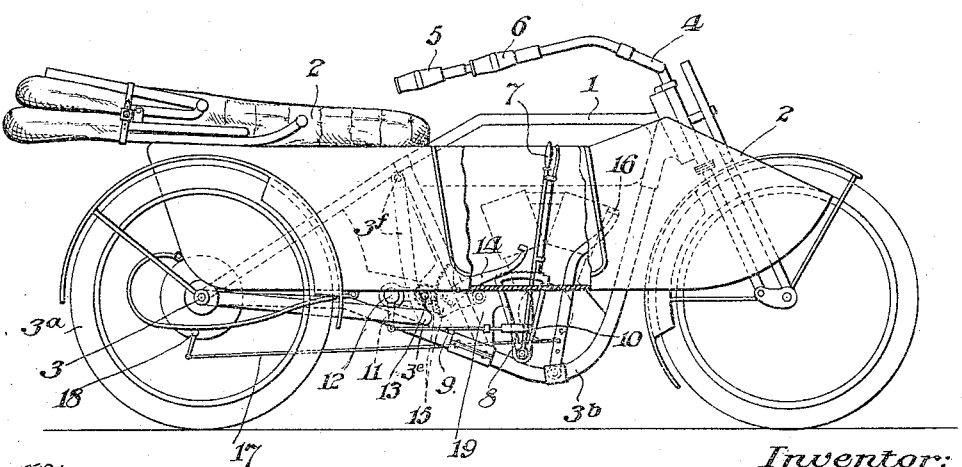

In the accompanying drawings Figure 1 is a top plan view of the side car connected to a motor cycle and Fig. 2 is a side elevation of a side car connected to a motor cycle, each view showing the operating and controlling mechanism.

Similar reference characters refer to similar parts throughout the drawings.

Referring to the drawings in detail the numeral 1 designates the frame of a motor cycle of any preferred or well known type. A horizontal axle forming bar 3, suitably secured to the frame 1, extends therefrom for a sufficient distance to permit of the side car chassis 2 being mounted thereon, and at its other extremity has rotatably mounted thereon the ground wheel 3ª, suitable anti-friction bearings being interposed between said bar 3 and the hub of the wheel 3ª so that the latter may revolve freely about the axle. A supporting bar 3ᶜ, suitably connected to the bar 3 as at 3ᵈ extends parallel to the said frame 1 and then is bent as at 3ᵉ to extend parallel with the bar 3 as illustrated in dotted lines on Fig. 1 and is secured to the frame 1 as at 3ᶠ in any suitable manner.

Additional supporting bars 3ᵇ and 3ᵍ are secured to the bar 3 and extend to the point 3ʰ, as shown by dotted lines in Fig. 1, where they join and then extend to and are fastened to the head of the said frame 1.

The side car chassis 2 is mounted on said axle forming bar 3 and the supporting bars 3ᵇ, 3ᶜ and 3ᵍ in a rigid manner and the said bar 3 and supporting bars 3ᵇ, 3ᶜ and 3ᵍ are firmly secured to the frame 1 as illustrated and described, thus bringing said side car chassis 2 close up to the auto cycle frame 1. With the elimination of the seat usually carried by auto cycles and also the elimination of the pedals on the sides of auto cycles, the side car chassis 2, in the present device, is brought much nearer to the auto cycle than can be done with the seat and pedals, in place, of the usual type.

A handle bar frame 4 secured to the frame 1 has the handle bars 5 and 6 as illustrated. These handle bars 5 and 6 terminate in the handle bar grips 5ª and 6ª, the said handle bars being made of hollow material through which connections are made in the usual way with the spark and gas mechanism of the auto cycle, the handle bar grip 5ª operating the spark and the handle bar grip 6ª operating and controlling the gas in the usual manner. The handle bar frame 4 is so constructed, as shown, as to bring the handle bars 5 and 6 and their grips 5ª and 6ª in a position where they may be easily operated from the side car.

A bracket 19 is secured to the under side of the side car chassis 2 as illustrated and the ratchet 8 is suitably secured to said bracket 19 as shown.

A hand lever 7 is secured to the side car frame 2 as illustrated and operates on said ratchet 8, an opening being provided in the floor of said side car chassis 2 to permit of the hand lever 7 passing therethrough.

A connecting rod 9, having a lug 10, which catches on hand lever 7, connects said hand lever 7 with the clutch 12 by means of the rod 11 as illustrated. The clutch 12 is suitably secured to the bracket 19. The mechanism herein described is all secured to said bracket 19 under the frame of side car chassis 2, suitable openings being provided in the floor of the side car 2 for the desired parts to pass therethrough.

A foot lever 14, secured to said bracket 19 as illustrated connects as shown with the gears 15 which operate the kicker 13, which in turn turns over the engine on the motor cycle.

A foot lever 16 suitably secured to the under side of side car chassis 2 and extending through an opening in the bottom thereof operates the brake 18 on the frame 1 by means of the connecting rod 17.

The method of operation is briefly as follows: The operator takes his seat in the side car chassis 2, which as hereinbefore described, is mounted in close proximity to the motor cycle, the handle bars 5 and 6 as illustrated and described being within easy grasp of the sitting operator, the handle bar grip 6ᵃ is turned in the usual way thereby putting the gas on. Operator then pushes down with his foot the foot lever 14 which operates the gears 15 which in turn operate the kicker and turn over the engine thus putting the machine in action. The operator controls the spark by means of the grip 5ᵃ and its connecting parts. By means of the hand lever 7 and its connecting parts, which is within easy reach of the operator, such operator controls his clutch mechanism to obtain his various degrees of speed. At his feet the operator has the foot lever 16 with its connecting rod to the brake 18 on the motor cycle. By pushing thereon with his foot the operator can put the brake in operation.

Having thus described my invention what I claim as new and desire to secure by Letters Patent is:

1. In combination with a motor cycle, provided with a handle bar frame, having handle bars terminating in grips by means of which connection is had to the gas and spark mechanism of the motor cycle, of a side car, mounted on rods extending from and connected to said motor cycle, having secured therebeneath a bracket to which the operating mechanism of the motor cycle is operatively secured, such operating mechanism comprising gears, a foot lever, a kicker connected to the motor on said motor cycle and operated by said gears by means of said foot lever to operate the motor, and a clutch mechanism, a hand lever operatively connected therewith to secure various degrees of speed, all substantially as shown and described.

2. In combination with a motor cycle, provided with a brake and a handle bar frame, having handle bars terminating in grips by means of which connection is had to the gas and spark mechanism of the motor cycle, of a side car, mounted on rods extending from and connected to said motor cycle, having secured therebeneath a bracket to which the operating mechanism of the motor cycle is operatively secured, such operating mechanism comprising gears, a foot lever, a kicker connected to the motor on said motor cycle and operated by said gears by means of said foot lever to operate the motor, a clutch mechanism, a hand lever operatively connected therewith to secure various degrees of speed and a foot lever secured to the under side of said side car and extending through an opening in the bottom thereof, a connecting rod between said foot lever and the brake on said motor cycle, to operate said brake, all substantially as shown and described.

3. In combination with a motor cycle, provided with a handle bar frame constructed as shown so as to be operated from a side car, having handle bars terminating in grips by means of which connection is had to the gas and spark mechanism of the motor cycle, of a side car, mounted, in close proximity thereto, on rods extending from and connected to said motor cycle, having secured therebeneath a bracket to which the operating mechanism of the motor cycle is operatively secured, such operating mechanism comprising gears, a foot lever, a kicker connected to the motor on said motor cycle and operated by said gears by means of said foot lever to operate the motor, and a clutch mechanism, a hand lever operatively connected therewith to secure various degrees of speed, all substantially as shown and described.

In testimony whereof I affix my signature in presence of two witnesses.

JOHN JAGGARD.

Witnesses:
  Wm. N. Beadle,
  M. Van Booskirk.